US009824545B2

(12) United States Patent
Smith et al.

(10) Patent No.: US 9,824,545 B2
(45) Date of Patent: Nov. 21, 2017

(54) INFORMATION PROVISION (71) Applicant: NCR Corporation, Duluth, GA (US)

(72) Inventors: Martin Smith, Dundee (GB); Heather McCracken, Fife (GB); Norman G. Taylor, Dundee (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/930,554

(22) Filed: Jun. 28, 2013

(65) Prior Publication Data
US 2015/0001289 A1 Jan. 1, 2015

(51) Int. Cl.
G06Q 40/00 (2012.01)
G07D 11/00 (2006.01)
G07F 19/00 (2006.01)
G06Q 20/32 (2012.01)

(52) U.S. Cl.
CPC ......... *G07F 19/20* (2013.01); *G06Q 20/3278* (2013.01)

(58) Field of Classification Search
CPC .................................................... G07F 19/201
USPC ................................ 235/451, 492, 379–383
See application file for complete search history.

(56) References Cited

U.S. PATENT DOCUMENTS

| 8,336,766 | B1 * | 12/2012 | Miller et al. ................... 235/379 |
| 8,632,000 | B2 * | 1/2014 | Laracey ......................... 235/379 |
| 8,640,946 | B1 * | 2/2014 | Block et al. ................... 235/379 |
| 8,881,977 | B1 * | 11/2014 | Paczkowski ....... G06Q 20/1085 235/379 |
| 2005/0200598 | A1 * | 9/2005 | Hayes .................... H04B 1/202 345/156 |
| 2006/0090073 | A1 * | 4/2006 | Steinberg ................ G06F 21/31 713/170 |
| 2009/0319893 | A1 * | 12/2009 | Pihlaja ................ G06F 3/03547 715/702 |
| 2009/0321510 | A1 * | 12/2009 | Day et al. ..................... 235/375 |
| 2010/0038419 | A1 * | 2/2010 | Blake ..................... G07D 9/008 235/379 |
| 2010/0059587 | A1 * | 3/2010 | Miller et al. .................. 235/379 |
| 2010/0082485 | A1 * | 4/2010 | Lin et al. ........................ 705/44 |
| 2010/0082491 | A1 * | 4/2010 | Rosenblatt ............. G06Q 10/02 705/65 |
| 2011/0139649 | A1 * | 6/2011 | Marcinkowski ....... B65D 25/20 206/354 |
| 2011/0215341 | A1 * | 9/2011 | Bond ...................... H01L 33/58 257/81 |
| 2012/0160912 | A1 * | 6/2012 | Laracey ........................ 235/379 |
| 2012/0171952 | A1 * | 7/2012 | Ohira et al. .................. 455/41.1 |
| 2012/0239577 | A1 * | 9/2012 | Wolfs et al. .................... 705/64 |
| 2012/0265679 | A1 * | 10/2012 | Calman ................ G07F 19/202 705/43 |
| 2012/0303527 | A1 * | 11/2012 | Karlisch ............. G07F 19/2055 705/44 |
| 2013/0029685 | A1 * | 1/2013 | Moshfeghi ............. G01S 19/48 455/456.1 |
| 2013/0124411 | A1 * | 5/2013 | Kobres et al. ................. 705/43 |

(Continued)

*Primary Examiner* — Tuyen K Vo
(74) *Attorney, Agent, or Firm* — Schwegman, Lundberg & Woessner (57) ABSTRACT

A method and apparatus are disclosed for providing information to a customer of a Self-Service Terminal (SST) such as an Automated Teller Machine (ATM). The method includes the steps of updating storage data of a Near Field Communication (NFC) device at an SST and reading data associated with the storage data from the NFC device via a mobile terminal of a customer at the SST.

15 Claims, 5 Drawing Sheets

(56) References Cited

U.S. PATENT DOCUMENTS

| | | | |
|---|---|---|---|
| 2013/0238456 A1* | 9/2013 | Soysa | G06Q 20/327 705/21 |
| 2013/0238497 A1* | 9/2013 | Ramachandran et al. | 705/41 |
| 2013/0257307 A1* | 10/2013 | Mieskoski | H05B 41/2985 315/224 |
| 2013/0325620 A1* | 12/2013 | Walker | G06Q 30/0623 705/14.64 |

* cited by examiner

INFORMATION PROVISION

FIELD OF THE INVENTION

The present invention relates to a method and apparatus for providing user information to a customer of a Self-Service Terminal (SST). In particular, but not exclusively, the present invention relates to a method of providing data to a mobile terminal of a customer at an SST, such as an Automated Teller Machine (ATM), from a Near Field Communication (NFC) device of the ATM. The information can subsequently be utilised to help complete a transaction or be used for other purposes.

BACKGROUND TO THE INVENTION

Various types of Self-Service Terminal (SST) are known and these can be used by a customer to carry out a transaction. A transaction may involve the dispensation of something from the SST or may include the deposit of something at the SST by a customer. An example of an SST is an Automated Teller Machine (ATM) and these are often used by customers to withdraw items of media in the form of currency notes or to make deposits of currency notes. It is appreciated that from time to time in order to initiate a transaction at the SST a customer must identify themselves in some way. This often includes a customer presenting a token in the form of a bank card or the like and entering a PIN. This is prone to error and security risk.

In addition to or as an alternative to carrying out a transaction at an SST, there are occasions when it would be helpful to provide a customer of an SST with information. Such information could be any one of a wide variety of topics which could be used by a customer for a wide variety of uses. Until now, the provision of information to a customer at an SST has been a complicated process and has required SSTs to be regularly updated in an inconvenient and time consuming manner.

SUMMARY OF THE INVENTION

It is an aim of certain embodiments of the present invention to at least partly mitigate the above-mentioned problems.

It is an aim of certain embodiments of the present invention to provide a method and apparatus for providing user information to a customer of a Self-Service Terminal (SST).

It is an aim of certain embodiments of the present invention to enable a customer to identify themselves at a pre-determined location and for an SST at that location to perform a transaction with that customer responsive to a verification step being carried out.

It is an aim of certain embodiments of the present invention to enable customers with a mobile terminal such as a mobile phone to conveniently read data from an NFC device of an SST and for the read data to be utilised to initiate and/or complete a customer transaction at a desired SST.

It is an aim of certain embodiments of the present invention to enable information of a broad variety of types to be conveniently provided to customers at an SST.

According to a first aspect of the present invention there is provided a method of providing information to a customer of a Self-Service Terminal (SST), comprising the steps of:
updating storage data of a Near Field Communication (NFC) device at an SST; and
reading data, associated with the storage data, from the NFC device via a mobile terminal of a customer of the SST.

Aptly, the method further comprises modifying the storage data by selectively updating new storage data to the NFC device from the SST.

Aptly, the method step of updating storage data comprises, from a network centre node of a network of SSTs, providing new network data to at least said SST;
storing said new network data at the SST; and
writing new storage data corresponding to the new network data to the NFC device at a pre-determined time.

Aptly, the method further comprises providing information to the customer of the mobile terminal via a User Interface (UI) of the mobile terminal responsive to the data read from the NFC device.

Aptly, the method further comprises executing a transaction at the SST responsive to providing the information to the user of the SST.

Aptly, the information comprises one or more electronic voucher, at least one electronic coupon, location information for the SST and/or an authorisation code for a transaction executable at the SST.

Aptly, the method further comprises reading the data by locating the mobile terminal proximate to the NFC device at the SST.

Aptly, the method further comprises locating the mobile terminal by tapping the mobile terminal to a pre-determined location on a fascia of the SST.

Aptly, the method further comprises:
launching a transaction application at the mobile terminal;
authenticating a user of the mobile terminal;
selecting a transaction to be executed at the SST via a UI of the SST or mobile terminal;
authorising a transaction responsive to said step of reading said data; and
instructing the SST to execute the selected transaction via a server remote from the SST.

Aptly, the NFC device comprises an NFC tag, such as an NFC smart poster tag.

According to a second aspect of the present invention there is provided a Self-Service Terminal (SST) for providing information to a customer, comprising:
a Near Field Communication (NFC) device comprising a data store, storing storage data, that can be written to; and
an SST processor connected to the NFC device that selectively receives new network data from a remote network centre node and is arranged to update said storage data at the NFC device responsive to said new network data.

Aptly, the SST processor is connectable to a remote server node to receive instructions to execute a transaction subsequent to providing data from the NFC device to a mobile terminal of a customer of the SST wherein said data is associated with said storage data.

Aptly, the NFC device is readable by a mobile terminal located proximate to the NFC device to provide data to the mobile terminal that provides information to a customer of the SST in possession of the mobile terminal.

Aptly, said information comprises one or more of marketing information, at least one electronic voucher, at least one electronic coupon, location information for the SST and/or an authorisation code for a service available at the SST.

Aptly, the SST is an Automated Teller Machine (ATM) and the NFC device is located proximate to a fascia panel region of the ATM.

According to a third aspect of the present invention there is provided a method of providing contactless services at a Self-Service Terminal (SST), comprising:

providing information associated with an SST from the SST via a contactless Near Field Communication (NFC) enabled communication link to a mobile terminal of a customer of the SST.

Certain embodiments of the present invention may enable data stored in an NFC device at a Self-Service Terminal (SST) to be updated from time to time and for the stored data to subsequently be read by a mobile terminal of an SST customer in a highly convenient manner. The information provided to the customer can be utilised to facilitate execution of a transaction at the SST or for a wide variety of other reasons. The mobile terminal may be a smartphone, tablet, laptop or the like.

Certain embodiments of the present invention may enable customers to approach an SST and scan an NFC device to take away some information from the machine. The type of information could be any of a wide variety of types such as marketing information, vouchers, coupons, or the like. Under certain circumstances, the information can be utilised to allow a mobile terminal of the customer to request that the SST performs a transaction. For example, if the SST is an ATM, the information received from the NFC device can be used to stimulate a mobile terminal of a customer to request that the SST dispense currency notes at that moment in time and that location.

Certain embodiments of the present invention may enable a customer of an ATM to conveniently walk up to an ATM and tap an NFC device, such as an NFC smart tag, on the ATM with their mobile phone. The mobile phone reads the ATM NFC device data and an application on the mobile phone communicates with a remote server informing the server that there is a customer at a particular ATM and potentially what transaction a customer wants if that customer has pre-staged a transaction. The remote server can then tell the ATM to fulfil a transaction since it knows that a desired customer is in front of the ATM at that precise moment in time.

Certain embodiments of the present invention may allow an SST to offer contactless services to customers in a format that is easily accessible from a wide range of mobile terminals. The SST is also enabled to dynamically change data that can be stored in and broadcast from an NFC device of the SST as and when required.

BRIEF DESCRIPTION OF DRAWINGS

Embodiments of the present invention will now be described hereinafter, by way of example only, with reference to the accompanying drawings in which.

DESCRIPTION OF EMBODIMENTS

In the drawings like reference numerals refer to like parts.

Figure 1:
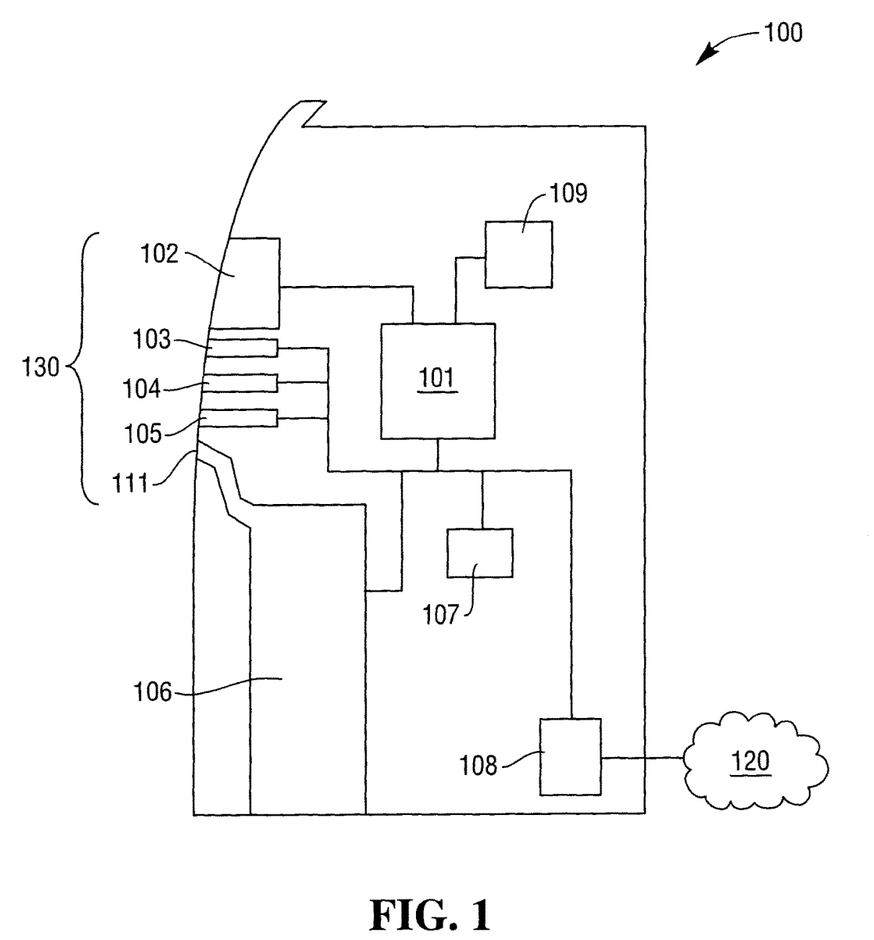
FIG. 1 illustrates a schematic of an Automated Teller Machine (ATM) according to an embodiment of the present invention.

FIG. 1 illustrates a block diagram of a Self-Service Terminal (SST) 100 in the form of an Automated Teller Machine (ATM) according to an embodiment of the present invention. It will be understood that certain embodiments of the present invention are applicable to other types of SST, such as vending machines, kiosks, or the like.

The ATM 100 includes different modules for enabling transactions to be executed and recorded by the ATM 100. These ATM modules include user transaction modules and service personnel modules. The ATM modules include an ATM controller 101, a customer display 102, a card reader/writer module 103, an encrypting keypad module 104, a receipt printer module 105, a cash dispense/deposit module 106, a journal printer module 107 for creating a record of every transaction executed by the ATM, a connection module 108, an operator panel module 109 for use by an authorised user of the SST, such as a service operator, field engineer, a replenisher (of currency, of printed paper or the like), or the like. A user interface 130 of the ATM 100 includes the customer display 102, card reader/writer module 103, encrypting keypad module 104, receipt printer module 105, and at least one currency dispense/deposit slot 111 in communication with the cash dispense/deposit module 106.

Certain customer transaction modules (such as the ATM controller 101) are also used by the service personnel for implementing management functions. However, some of the modules are referred to herein as service personnel modules (such as the journal printer module 107 and the operator panel module 109) because they are never used by ATM customers. The ATM 100 is a node or network end point in an overall financial network. The ATM 100 may be connected to the remainder of the financial network via a connection to the Internet 120. It will be appreciated that the ATM 100 could alternatively be connected to the remainder of the financial network via another suitable form of connection.

Figure 2:
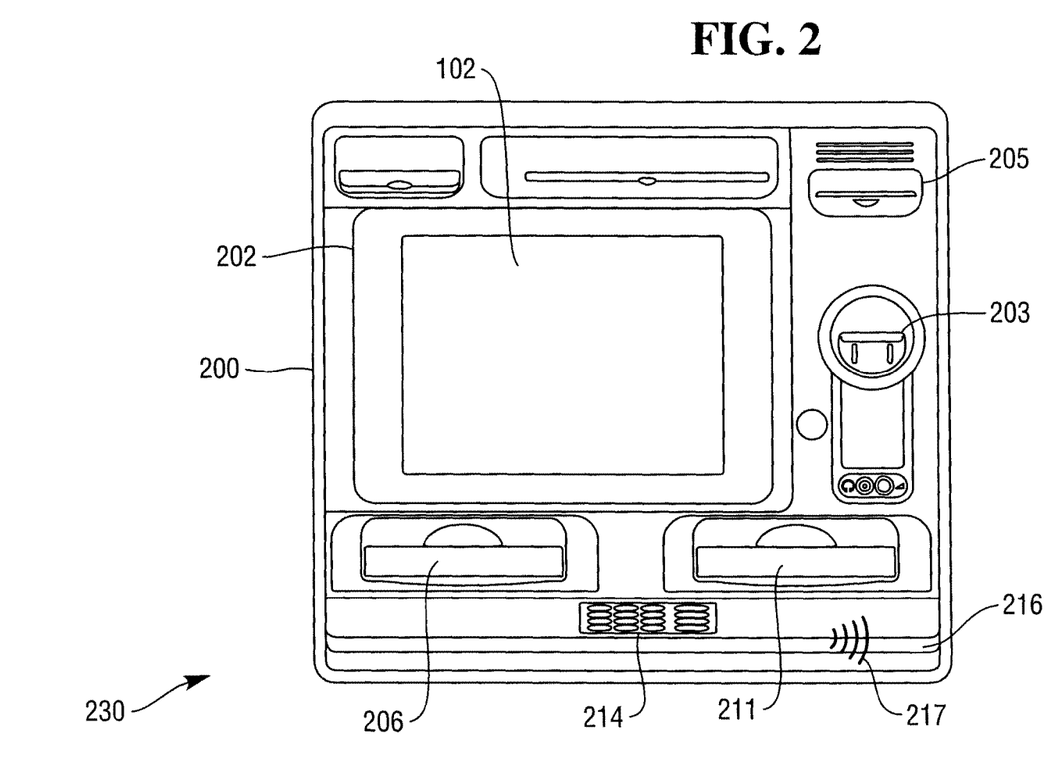
FIG. 2 illustrates a User Interface (UI) of an ATM according to an embodiment of the present invention.

With reference to FIG. 2, a fascia 200 of the ATM is mounted on a chassis (not shown) of the ATM. The fascia 200 provides the user (customer) interface (130 in FIG. 1) for allowing a customer to interact with the ATM. In particular, the fascia 200 has apertures aligned with respective modules of the ATM mounted behind the fascia 200. The fascia 200 includes a card reader aperture 203 in communication with the card reader module 103, at least one printer aperture 205 in communication with the receipt printer module 105, and a dispensing aperture 206 and deposit aperture 211 in communication with the cash dispense/deposit module 106. The fascia 200 also includes a display aperture 202 aligning with the customer display 102. A keypad 214 of the keypad module 104 is located on a shelf 216 extending outwardly from the bottom edge of the fascia 200.

A Near Field Communication (NFC) device (not shown) is located behind the shelf 216 (at the right hand end as viewed in FIG. 2). A visual cue 217 is provided on the shelf 216 to indicate the location of the NFC device to a customer at the ATM. The visual cue 217 may take the form of a sticker, etching, embossment, print, illumination, or the like.

Figure 3:
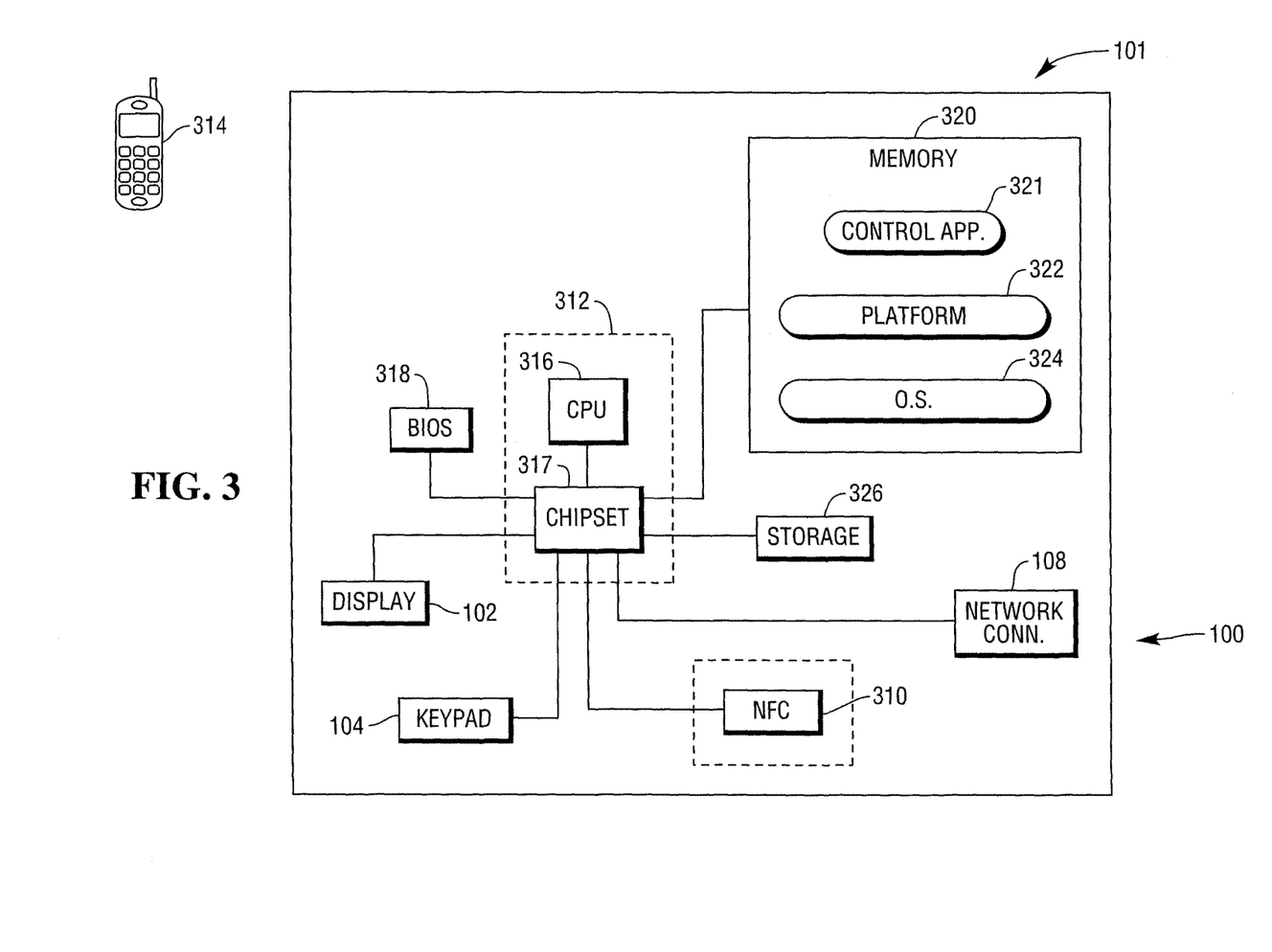
FIG. 3 illustrates control functions at the ATM and communication with a mobile terminal according to an embodiment of the present invention.

With reference to FIG. 3, the controller 101 of the ATM 100 includes a microprocessor 312 having a CPU 316 and chipset 317. BIOS 318 is stored in a non-volatile memory. Associated with the microprocessor 312 is a main memory 320 loaded with a control application 321, a platform 322 and an operating system 324. The ATM 100 is also provided with an ATM data store 326, in the form of a magnetic disc drive. The display module 102, keypad module 104 and NFC device 310 are connected to the microprocessor 312. A mobile terminal 314 of a customer is provided with an NFC communication capability; in other words, the NFC device 310 is readable by the mobile terminal 314 in order to read data from the NFC device 310. In order to do so, the mobile terminal 314 is brought into close proximity with the fascia 200 of the ATM 100 and the NFC device 310 located behind the fascia (otherwise known as "tapping" the mobile terminal 314 on the ATM). The mobile terminal 314 may be a smart phone, tablet, laptop, or the like.

Figure 4:
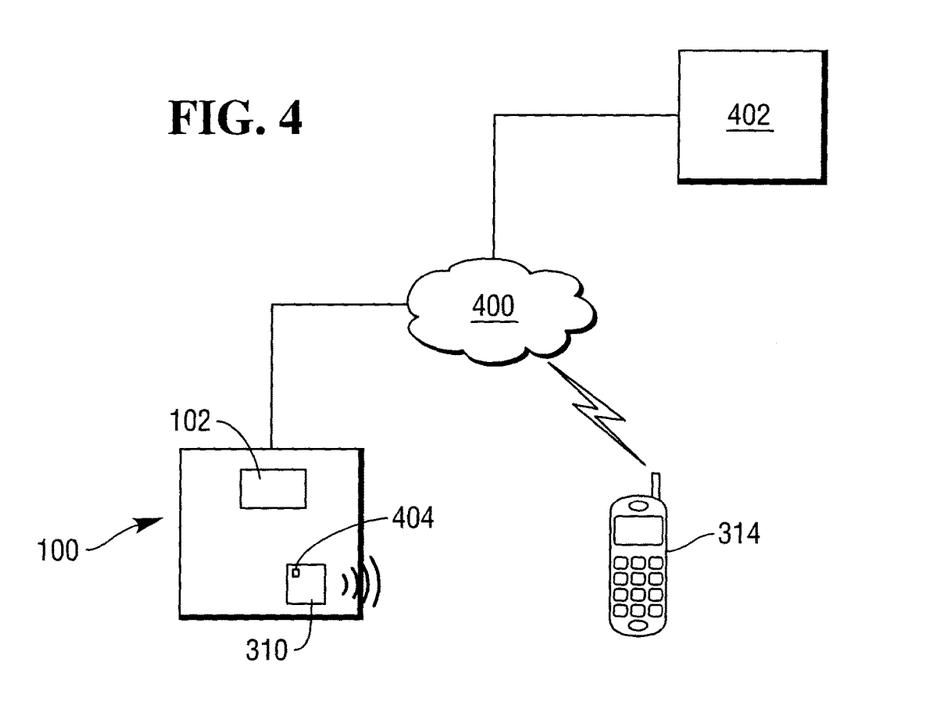
FIG. 4 illustrates a communication network according to an embodiment of the present invention.

With reference to FIG. 4, the ATM 100 is connected via the connection module 108 and a network 400, such as a virtual private network (VPN) or the internet or the like, to an ATM network centre 402. The NFC device 310 has an NFC data store 404. From time to time, new data is supplied by the network centre 402 to the ATM 100 via the network 400. The data may be, for example, marketing information, an electronic voucher, an electric coupon, location information for the ATM 100, or an authorisation code for the services available at the ATM 100, or the like. The new data is stored and updated at the ATM 100 as well as being stored and updated in the data store 404 of the NFC device 310. The ATM controller 101 communicates with the NFC device 310 in order to selectively update data stored in the NFC data store 404 responsive to new data received by the ATM and the ATM data store 326. This allows the ATM to dynamically update and/or selectively change data being stored on the NFC device 310 and accordingly the information available for transfer to a customer. The NFC device 310 allows information to be written to the device and to be updated when required, whilst allowing the information to be read from the device by an NFC reader device, such as a mobile phone or tablet.

According to one embodiment of the present invention, a customer approaches the ATM 100 and scans the NFC device 310 with a suitable mobile terminal, such as a smartphone to receive information associated with the ATM 100 and to display such information in the display of the mobile terminal 314. The type of information could be any of a wide variety of types such as marketing information, e-vouchers, e-coupons or certain details about the ATM 100, such as ID or location of the ATM 100. The NFC device may be an NFC tag, such as a so-called 'smart poster tag', for example. The NFC device of the ATM is effectively operating in 'card emulation' mode wherein information of interest to the customer is transferred to the mobile terminal and can be acted upon by the mobile terminal potentially via the network centre when the NFC device is scanned by the mobile terminal.

According to another embodiment of the present invention, information associated with the customer, such as ID, account details, or the like, is input by the customer and stored on the mobile terminal 314 via an application of the mobile terminal. The customer approaches the ATM 100 and scans the NFC device 310 with the mobile terminal which automatically launches the application in the display of the mobile terminal 314. Alternatively, the customer may manually launch the application on the mobile terminal before scanning the NFC device of the ATM 100. Information associated with the customer is then transferred from the mobile terminal 314 to the network centre 402 via the ATM 100 and network 400, or directly from the mobile terminal, to identify the customer and authorise/initiate a transaction.

Alternatively, the mobile terminal may include an NFC device capable of reading information associated with a customer and user of the mobile terminal. The NFC device of the ATM may include an NFC reader which is capable of reading the NFC device of the mobile terminal when the mobile terminal is placed in close proximity to the NFC device of the ATM. Information associated with the customer, such as ID, account details, or the like, is transferred from the mobile terminal to the network centre 402 via the ATM NFC device and the network 400. This allows the ATM to have the functionality of a contactless card reader wherein the mobile terminal is effectively operating like an identification card of a customer. Of course, a physical contactless card may be used instead of a mobile terminal which stores information associated with the customer and which is readable by the ATM NFC device. When the ATM NFC device is in such a 'reader/writer' mode, it reads information from the mobile terminal NFC device allowing the transfer of information from the mobile terminal to the ATM NFC device.

The NFC device 310 of the ATM may operate in the 'reader/writer' mode or 'card emulation' mode, or may selectively operate in either mode.

Figure 5:
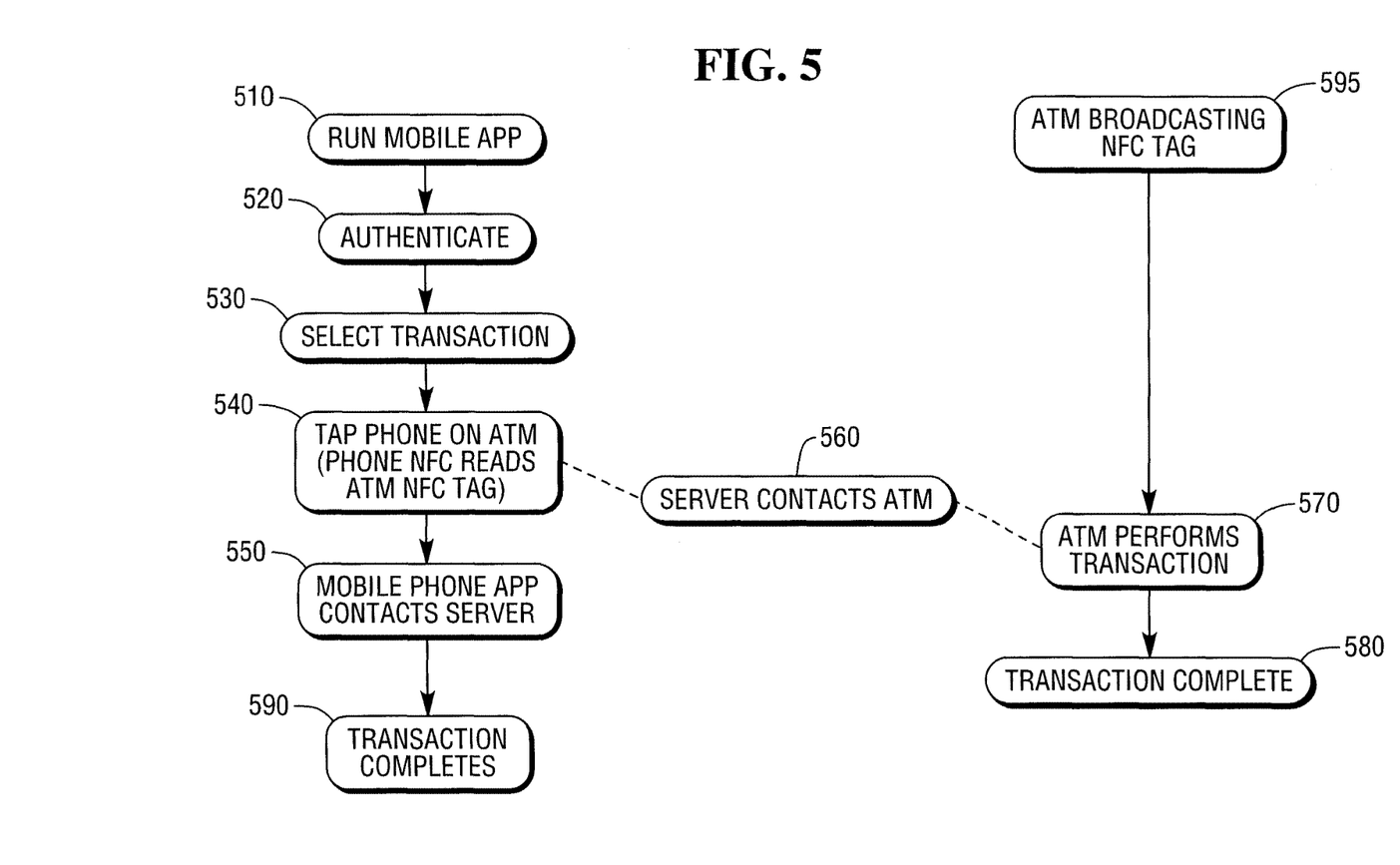
FIG. 5 illustrates execution of a transaction at an ATM according to an embodiment of the present invention.

According to another embodiment of the present invention, as shown in FIG. 5, a customer initiates a first stage of a transaction on a computer or mobile terminal 314 at a remote location relative to the ATM 100. The application is launched by the customer on the mobile terminal 314 (shown at step 510). The customer is required to input account/ID details, such as a PIN code and/or security question(s), via the application on the mobile terminal 314 to authorise the initial stage of the transaction (at step 520). A desired transaction is selected (at step 530) by the customer via the application, such as a withdrawal of currency notes from an ATM 100.

Optionally, initial transaction information, is sent from the mobile terminal 314 to the network centre 402 via the network and a respective ATM 100 or a subset of all ATM's in a distributed network or all ATM's in a distributed network is prepared accordingly for the customer initiated transaction to be completed at the ATM 100. The respective ATM 100 may be chosen by the network centre 402 in accordance with a location of the customer, i.e. the respective ATM 100 may be the closest or most convenient ATM to the customer at the time of the initial transaction stage being made by the customer or the customer may select a preferred ATM 100 as part of the initial transaction stage at which to complete the transaction and from which to receive dispensed items of value, such as currency notes. Aptly the location of the customer is determined via a GPS application/function of the mobile terminal 314 and the location of the respective ATM 100 is provided to the customer via the mobile terminal 314. The customer is directed to the respective ATM via a navigational application of the mobile terminal 314. Alternatively, the ATM at which a transaction is to be completed is determined when the customer scans the NFC device 310 of an ATM 100 to indicate their presence and readiness to complete the transaction at that particular ATM 100.

The initial transaction information sent to the respective ATM 100, optionally including a unique transaction ID, is received by the ATM 100 via the network 400 and updated to the NFC device 310 of the ATM 100 by the controller 101. When ready, the customer scans the NFC device 310 of the ATM 100 with their mobile terminal 314 to read the data stored on it (at step 540). This action of scanning the device or 'tapping' the ATM launches the respective transaction application on the mobile terminal 314 of the customer and allows the customer to enter or amend the pre-staged transaction accordingly, such as by adding a value of currency notes to be dispensed at the ATM. The action of scanning the NFC device also indicates to the ATM that the customer is present at the ATM to complete the transaction. To authorise the customer's ID, the transaction ID stored on the NFC device 310 is optionally matched with a transaction ID subsequently sent to the mobile terminal 314 and/or with a parameter associated with the customer's ID, such as a parameter of the mobile terminal 314. Authorisation may take place locally at the ATM 100 and/or at the network centre 402 via the network 400. Transaction information, including for example customer ID, account details, transaction details and, optionally, a transaction ID, are sent to the ATM via the network centre 402 and the network 400 (at step 550). Once the customer has been identified and the initial transaction stage has been authorised at the ATM 100, the network centre 402 communicates with the ATM 100 (at step 560) and the transaction is performed at the ATM 100 (at step 570). For example, currency notes are dispensed at the ATM 100 to the customer, to complete the transaction (at step 580). Where a transaction does not involve dispensation of items of media from an SST, such as a currency notes from an ATM, transaction information, such as account balance, transaction history, or the like, is received by the mobile terminal 314 from the network centre 402 via the network 400, and the transaction is completed (at step 590). Information associated with the ATM 100 and/or banking body, such as marketing information, ATM details, or the like, which is stored in the NFC device 310 of the ATM 100 is continuously or selectively updated by the network centre 402 via the network 400 (at step 595).

According to another embodiment of the present invention, a customer initiates and completes a transaction via the mobile terminal 314 whilst at an ATM 100. In this embodiment, the customer scans the NFC device 310 of a chosen ATM 100 to launch a transaction application on the mobile terminal 314. This indicates to the ATM that a customer is present and optionally transfers information associated with the customer, such as ID and/or account details, from the mobile terminal 314 to the ATM 100 via the NFC device to authenticate the user of the mobile terminal. In this manner, the NFC device operates as a contactless card reader wherein the mobile terminal operates like an ID card of the customer. The customer then selects and initiates a desired transaction by inputting a PIN code, or similar security details, via the application of the mobile terminal 314. Transaction details, such as a value of currency notes to be dispensed at an ATM, are input by the customer via the mobile terminal 314. Information and/or data may be communicated between the mobile terminal and the ATM and via the network centre via an ATM communications channel and/or a communications channel of the mobile terminal. Once the transaction is authorised either locally at the ATM and/or at the network centre 402 via the network 400, the ATM dispenses currency notes, or similar items of value, to the customer in accordance with the transaction. The transaction is then complete.

There are many NFC device types available in various ISO standards such as ISO 15693, ISO 14443-A, ISO 14443-B, ISO 14443-B(SRIxx) and ISO 18092. It will be appreciated that certain embodiments of the present invention are not restricted to NFC devices having any predetermined ISO standard compatibility. Rather, certain embodiments of the present invention are broadly applicable to the use of NFC devices. It will be appreciated that NFC is a set of short-range wireless technologies which require devices communicating with each other to be separated by a distance of 20 cm or less, typically around 10 cm. Aptly, communication between an NFC device and an NFC reader occurs over a distance of around 20 cm to around 4 cm or less. The communication operates at around 13.56 MHz with data rate exchanges ranging from around 106 kbit/s to 424 kbit/s. In passive NFC devices, a reader acts as an initiator device and provides a carrier field whilst the NFC device acts as a target device answering the field generated by the initiator device by modulating the existing field. In this way, the target device may draw its operating power from the initiator-provided electromagnetic field. This is thus a passive communication mode. Certain embodiments of the present invention can optionally use such passive NFC devices or alternatively can utilise NFC devices able to operate in a so-called active communication mode. In this mode, both the initiator device and target device communicate by alternatively generating their own fields. Each device de-activates its own RF field whilst waiting for data. Active or 'dynamic' NFC devices thus have their own power (which may aptly be rechargeable) and are able to generate their own detectable field. Suitable dynamic NFC devices 310 for certain embodiments of the present invention include the Sony RC-S801 and RC-802 NFC tags.

Certain embodiments thus provide a programmable NFC device which can be dynamically updated by a Self-Service Terminal (SST), such as an Automated Teller Machine (ATM), to which the device is attached. The device enables banks or other bank partners or other such institutions which exercise control over the SST to transfer digital information or content to be conveniently picked up by customers. Using a dynamic NFC device allows this information to be updated as often and as quickly as required and the information can be used for a wide variety of purposes such as execution of a transaction.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of providing information to a customer of a Self-Service Terminal (SST), comprising:
    updating storage data of a Near Field Communication (NFC) device at an SST within a data store of the NFC device, wherein the data store is separate from storage available from the SST; and
    reading data associated with the storage data, from the NFC device via a mobile terminal of a customer of the SST when the customer placed the mobile terminal at a location identified by the SST by a physical visual cue provided on a shelf of the SST having a keypad at such location, wherein the physical visual cue is at least one of: a sticker, an etching, and an embossment, and operating the SST in two modes a reader/writer mode and a card emulation mode, and wherein the NFC device is situated behind the shelf, and wherein the NFC device is a passive NFC device that draws power from and is activated by an NFC reader of the mobile terminal that generates an electromagnetic field when the mobile terminal is placed at the location.

2. The method as claimed in claim 1, further comprising: modifying the storage data by selectively updating new storage data to the NFC device from the SST.

3. The method as claimed in claim 1 wherein updating storage data comprises:
    from a network centre node of a network of SSTs, providing new network data to at least said SST;
    storing said new network data at the SST; and
    writing new storage data corresponding to the new network data, to the NFC device at a pre-determined time.

4. The method as claimed in claim 1, further comprising: providing information to the customer of the mobile terminal via a User Interface (UI) of the mobile terminal responsive to the data read from the NFC device.

5. The method as claimed in claim 4, further comprising: executing a transaction at the SST responsive to providing the information to the user of the SST wherein the reader/writer mode includes receiving a pre-staged transaction from an app on the mobile terminal.

6. The method as claimed in claim 4, wherein said information comprises one or more electronic voucher, at least one electronic coupon, location information for the SST and/or an authorisation code for a transaction executable at the SST.

7. The method as claimed in claim 1, further comprising: reading the data by locating the mobile terminal proximate to the NFC device at the SST.

8. The method as claimed in claim 7, further comprising locating the mobile terminal by tapping the mobile terminal to a pre-determined location on a fascia of the SST.

9. The method as claimed in claim 1, further comprising: launching transaction application at the mobile terminal;
    authenticating a user of the mobile terminal; selecting a transaction to be executed at the SST via a UI of the SST or mobile terminal;
    authorising a transaction responsive to reading said data; and
    instructing the SST to execute the selected transaction via a server remote from the SST.

10. A Self-Service Terminal (SST) for providing information to a customer, comprising:
    a Near Field Communication (NFC) device comprising a data store, storing storage data, that can be written to and a physical visual cue indicator on a shelf of the SST at a location for the customer of the NFC device within the SST to place a mobile terminal to communicate with the NFC device, wherein the physical visual cue is at least one of: a sticker, an etching, and an embossment, and wherein the NFC device is located behind the shelf having a keypad, and wherein the NFC device is a passive NFC device that draws power from and is activated by an NFC reader of the mobile device that generates an electromagnetic field when the mobile device is placed at the location; and
    an SST processor connected to the NFC device that selectively receives new network data from a remote network centre node and is arranged to update said storage data within the data store of the NFC device responsive to said new network data, the SST processor configured to operate in two modes: a reader/writer mode and a card emulation mode, and wherein the data store of the NFC device is separate from data storage of the SST.

11. The SST as claimed in claim 10, further comprising: the SST processor is connectable to a remote server node to receive instructions to execute a transaction subsequent to providing data from the NFC device to the mobile terminal of a customer of the SST wherein said data is associated with said storage data, and wherein the reader/writer mode includes receiving a pre-staged transaction from an app on the mobile terminal.

12. The SST as claimed in claim 10, further comprising: the NFC device is readable by the mobile terminal located proximate to the NFC device to provide data to the mobile terminal that provides information to a customer of the SST in possession of the mobile terminal.

13. The SST as claimed in claim 10, wherein said information comprises one or more of marketing information, at least one electronic voucher, at least one electronic coupon, location information for the SST and/or an authorisation code for a service available at the SST.

14. The SST as claimed in claim 10, wherein the SST is an Automated Teller Machine (ATM) and the NFC device is located proximate to a fascia panel region of the ATM.

15. A method of providing contactless services at a Self-Service Terminal (SST), comprising:
    providing information associated with an SST via a contactless Near Field Communication (NFC) enabled communication link to a mobile terminal of a customer of the SST, the information provided by the SST to the mobile terminal over the communication link when the mobile terminal is located at a location of the SST for an NFC device, the location identified by a physical visual cue provided on a shelf of the SST having a keypad at such location, wherein the physical visual cue is at least-one of: a sticker, an etching, and an embossment, and operating the SST in card emulation mode when providing the information, and wherein the NFC device is located behind the shelf and drawing power by and initiating the NFC device from a passive mode of operation to an active mode of operation when an electromagnetic field generated by a NFC reader of the mobile terminal is provided when the mobile terminal is placed at the location; and
    periodically updating, by the SST, NFC data located in an NFC data store that is separate from data storage of the SST responsive to a remote network providing the NFC data, and wherein the information is the NFC data maintained in the NFC device.

\* \* \* \* \*